United States Patent [19]

Pilat et al.

[11] 4,286,305

[45] Aug. 25, 1981

[54] ELECTRONIC SECURITY DEVICE AND METHOD

[76] Inventors: Eugene R. Pilat, 2035 Audubon Dr., Glendale Heights, Ill. 60137; George J. Franks, Jr., 261 Whitehall Dr., Palatine, Ill. 60072; Jerry F. Dyben, 541 Kirkmore Dr., New Haven, Ind. 46779

[21] Appl. No.: 28,861

[22] Filed: Apr. 10, 1979

[51] Int. Cl.$^3$ .............................................. H04Q 9/00

[52] U.S. Cl. ...................................... 361/172; 70/280

[58] Field of Search .................. 361/171, 172; 70/278, 70/280; 340/168 B

[56] References Cited

U.S. PATENT DOCUMENTS

| | | | |
|---|---|---|---|
| 3,872,435 | 3/1975 | Cestaro | 361/172 X |
| 3,889,501 | 6/1975 | Fort | 361/172 X |
| 4,104,694 | 8/1978 | Hargrove | 361/172 |

FOREIGN PATENT DOCUMENTS

| | | | |
|---|---|---|---|
| 2634303 | 2/1978 | France | 70/278 |
| 2012343 | 7/1979 | United Kingdom | 70/278 |

OTHER PUBLICATIONS

"Tampering is Out With C-MOS Lock", *Electronics*, 8 Aug. 1974.

Wicklund, J. B., "IC Key Opens Electronic Door Lock", *Radio-Electronics*, vol. 43, No. 6, Jun. 72, pp. 41-43.

*Primary Examiner*—J. D. Miller
*Assistant Examiner*—L. C. Schroeder
*Attorney, Agent, or Firm*—James T. FitzGibbon

[57] ABSTRACT

The present invention relates generally to security systems, and more particularly, to low cost, highly reliable mechanical-electronic locking units. The electronic security devices of the invention physically include a key assembly, a receptacle for the key in a door or other secured device, a receiver for decoding the signal sent from the key, and a novel electromechanical locking-and-unlocking component which is actuated electrically in response to an appropriate signal from the receiver.

11 Claims, 28 Drawing Figures

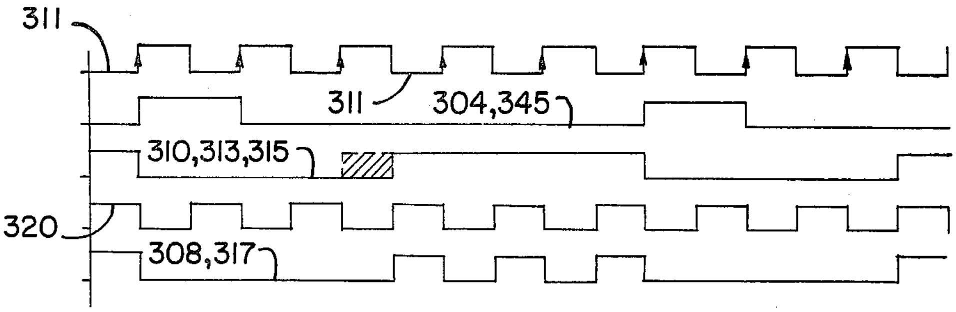
Fig. 17
Fig. 18
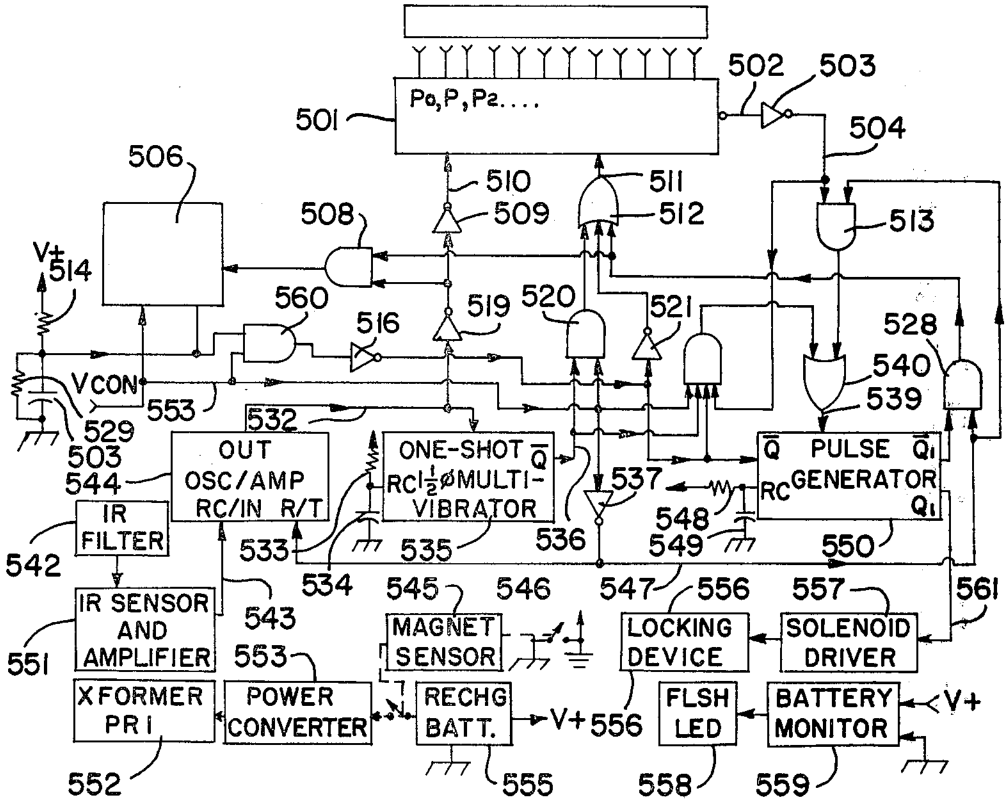

ELECTRONIC SECURITY DEVICE AND METHOD

BACKGROUND OF THE INVENTION

The present invention relates generally to security systems, and more particularly, to low cost, highly reliable mechanical-electronic locking units. The electronic security devices of the invention physically include a key assembly, a receptacle for the key in a door or other secured device, a receiver for decoding the signal sent from the key, and a novel electromechanical locking-and-unlocking component which is actuated electrically in response to an appropriate signal from the receiver.

Although the concept of electronic locking devices including a key unit capable of sending a coded signal to a receiver to unlock a door or the like are known, prior art devices have utilized various forms of apparatus characterized by a number of shortcomings. For example, in systems which are available at reasonable cost, the keys were easily duplicated because they were relatively simple, and because there were readily available methods of decoding the signal stored in the key. Accordingly, it was easy to duplicate such key and foil the electronic system.

Other units included a coding input apparatus, such as a key or the like, which was extremely delicate, and which accordingly lacked ruggedness and reliability. In still other cases, security systems included keys which, when tampered with, would disable the entire system, causing it to become non-functional after an attempt to tamper with the system had been made, in turn creating significant expense for the owner in repairing a system which had been tampered with.

Other units intended for this general purpose have required multiple signal paths for coding or synchronizing the operating of the key and the receiver. In certain of these prior art units, there would be, for example, three signal paths within the system, one path being dedicated to coding, or data, one being dedicated to synchronization or clocking, and the last to clearing or resetting.

Where signal transducers are required, such as optoelectronic or optomagnetic transducers, multiple signal path requirements made these units costly and unduly complex.

Other electronic locking devices require that the operator remember and enter a lengthy sequence or combination of numbers in order to enable the lock to be opened. Consequently, systems of this sort are not suitable for use by small children, are inconvenient for adults, and are not suitable for use by those who have difficulty remembering arbitrary numbers.

Still other prior art units are disadvantageous because they require power in the key, because they consume significant power in the code processing operation, or in the locking and unlocking operation. Still other systems have been devised which, while satisfactory in some respects, were excessively costly, or were not compatible with additional security features sought to be used with the lock, such as burglar alarm systems, fire detecting systems, etc.

Accordingly, in view of the shortcomings of the prior art, and the need for a simple, low cost highly secure electronic locking system, it is an object of the present invention to provide an improved electronic security system.

Another object of the invention is to provide an electronic security system of an improved character which includes a key unit, and a lock unit comprising a key receptacle, a decoder unit, a power supply, and an improved electromechanical, three position lock unit.

A further object of the invention is to provide a system which will overcome some or all of the drawbacks associated with the previous attempts to provide satisfactory electronic locks.

Still another object of the present invention is to provide an electronic security system using a key which is sufficiently complex to prevent duplication, but which is extremely low in cost compared to counterpart devices.

Another object is to provide an electronic system using a pair of integrated circuits which are internally identical, but which possess different external circuit components, with onecircuit being utilized in the key or transmitter, and the other being used in the decoder or receiver.

Another object is to provide a key-and-lock unit in which a predetermined unlocking code is sent continuously from the transmitter, received and decoded by the receiver, and if satisfactory, sends a signal which operates to energize a relay causing the lock to be opened.

A still further object is to provide an electromechanical locking system having novel and improved mechanical components, and more particularly, having a combination latch and lock which may operate in an open position, a dead bolt position and a preset intermediate position, and which is adapted to be moved between these positions either manually by the operator or electrically.

Another object of the present invention is to provide an electromechanical lock for use in an electronic security system wherein the lock is able to be moved from a locked to an unlocked position with minimal use of electrical energy, and which, if preset, will automatically move to a dead boltlocked position when the secured device is closed.

Another object is to provide an electronic key and lock system which is readily adaptable for use with electronic security components, such as burglar alarms, fire alarms, etc., and which is able to provide additional auxiliary functions without significant increase in cost.

A still further object of the invention is to provide an electronic lock system including a circuit having a programming pin which allows another copy of the receiver integrated circuit to function as a transmitter or key.

Yet another object of the invention is to provide a tamper proof enclosure for the key, whereby the security thereof cannot be compromised without destroying the key, and which will resist even determined attempts to compromise or foil the system.

Another object is to provide a low power-consumption system which is adapted to be energized by a variety of power supply systems.

Another object is to provide a coding and decoding electronic system wherein the frequency as well as the count of pulses may be varied so as to provide additional combinations and to increase security without measurable increase in cost.

A still further object is to provide an electronic security system which is convenient and compact in use, and which does not require the key or transmitter element to be self-powered, but which allows power for the operation of the key to be obtained from the receiver when and only the key is in place in the receptacle.

Another object of the invention is to provide an improved electronic security system wherein the pulsed code may be transmitted in the infrared spectrum by means of a fiber optic "light pipe" to the receiver unit, thereby providing additional security in relation to systems using electrical signal paths only.

Another object is to provide an improved system which is not susceptible to electromagnetic tampering, by reason of using a coded infrared optical signal pulse stream as the code.

Another object is to provide an improved electronic security system having a receiver which is effective to receive a series of coded pulses, to preset a counter at the beginning of a sequence of pulses, to count the incoming pulses, compare the number of incoming pulses with the predetermined code in the counter, and to energize an unlocking device if the number of pulses is identical and to disable the unlocking device if the number of pulses is not identical.

A still further object is to provide a lock and key apparatus wherein advantageous use may be made of semi-custom integrated circuitry so as to reduce the cost and improve the reliability and compatibility of the key and lock electronics.

Yet another object is to provide a combination electronic lock and key unit which includes semi-custom integrated circuitry in both the key or transmitter unit and in the receiver unit, with the circuitry being modified slightly by differing external components and connections so that otherwise identical components can perform different functions in their respective assemblies.

A still further object is to provide an electronic lock and key unit in which a single stream of clocked pulses is interrupted periodically for a definite interval to subdivide a continuous pulse stream into a series of periodic pulse streams each having a predeterminable code number of pulses, and which further includes means for transmitting the coded pulse stream to a receiver, comparing the number of pulses in the coded stream to a predetermined code number in the receiver, and for energizing an interlocking device in response only to reception of a stream of pulses having the identical coded number of pulses therein.

A still further object is to provide a key unit which includes special physical as well as electronic features, including an optical filter, a light pipe arrangement, and semicustom integrated circuitry, a transformer secondary circuit core and a magnetic coupler, all in a compact, sealed unit.

The foregoing and other objects and advantages of the invention are achieved in practice by providing a key unit which includes an oscillator component for emitting a stream of constant-width pulses, and a unit for interrupting the stream to create an open space between each stream of pulses, whereby a series of streams each having a predeterminable number of pulses therein are transmitted to the receiver in the form of infrared light signals. The stream of light signals is received, transduced and amplified, and sent to a decoder unit, which includes a counter adapted to go to a predetermined logic state when filled; and circuits arranged to determine whether the counter is filled simultaneously with the arrival of the blank space between coded transmissions. This latter circuitry includes a digital logic arrangement requiring coincidence of a carryout pulse from the counter and the blank space between transmissions, using this coincidence to energize a relay for unlocking the secured device. In a preferred form, the transmitter or key is unpowered until placed within the receptacle, whereupon magnets in the key energize the receiver unit and transmit power through an inductive circuit to the key, causing the transmitter and receiver elements to achieve proper initial states and then perform the sequence of sending an encoded transmission, decoding it, and unlocking it as described herein.

The manner in which these and other objects and advantages of the present invention are achieved in practice will become more clearly apparent when reference is made to the following detailed description of the preferred embodiments set forth by way of example and shown in the accompanying drawings in which like reference numbers indicate corresponding parts throughout.

Figure 1:
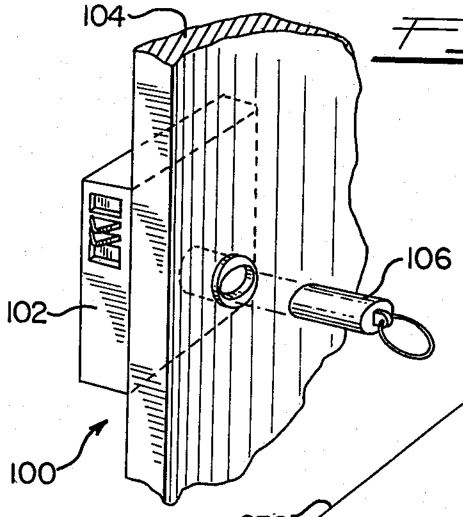
FIG. 1 is a fragmentary perspective view, showing a portion of a door having an electronic lock unit made according to the invention in place thereon, and showing the relationship between the key and the key receptacle in the door.
Figure 6:
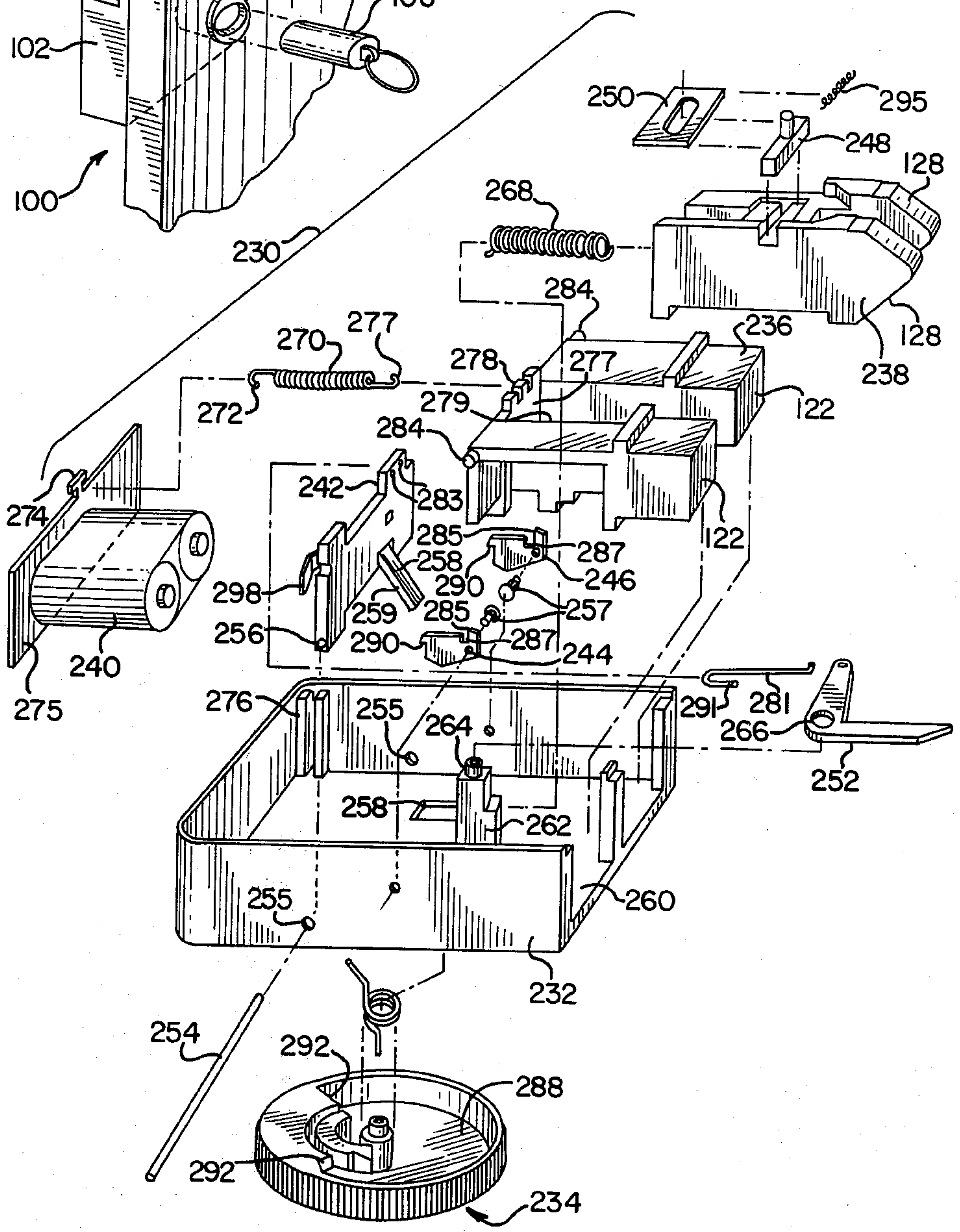
Figure 2:
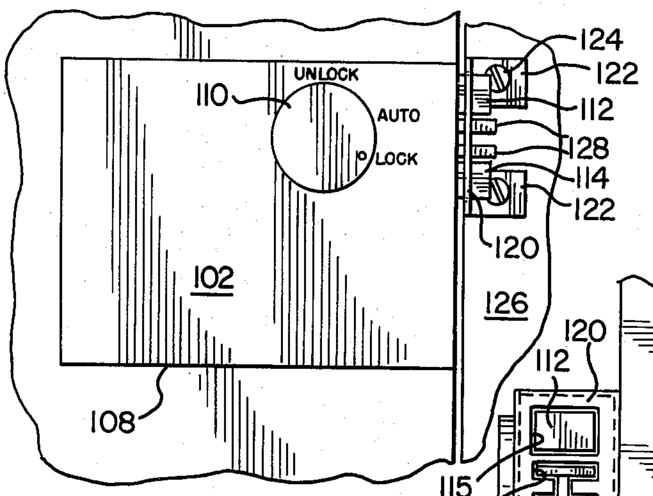
FIG. 2 is a fragmentary rear elevational view of the electronic unit of the invention, showing the unit affixed to a door in a closed and locked position, and taken from the inside of the door being locked.
Figure 3:
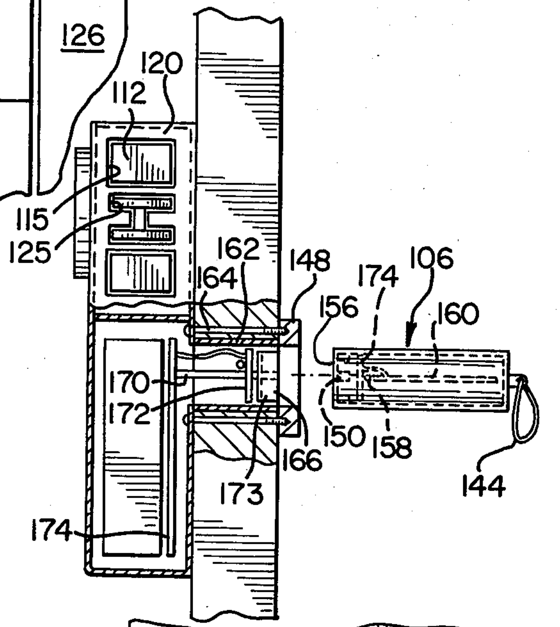
FIG. 3 is a side view, partly in elevation and partly in section, showing a door edge with the lock of the invention fixed in position of use, the door tube, and the key receptacle, with the key itself being shown in spaced apart relation from the key receptacle.
Figure 3A:
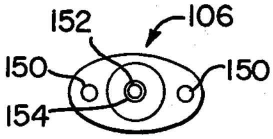
Figures 7, 8, 9, 10, 11, 12:
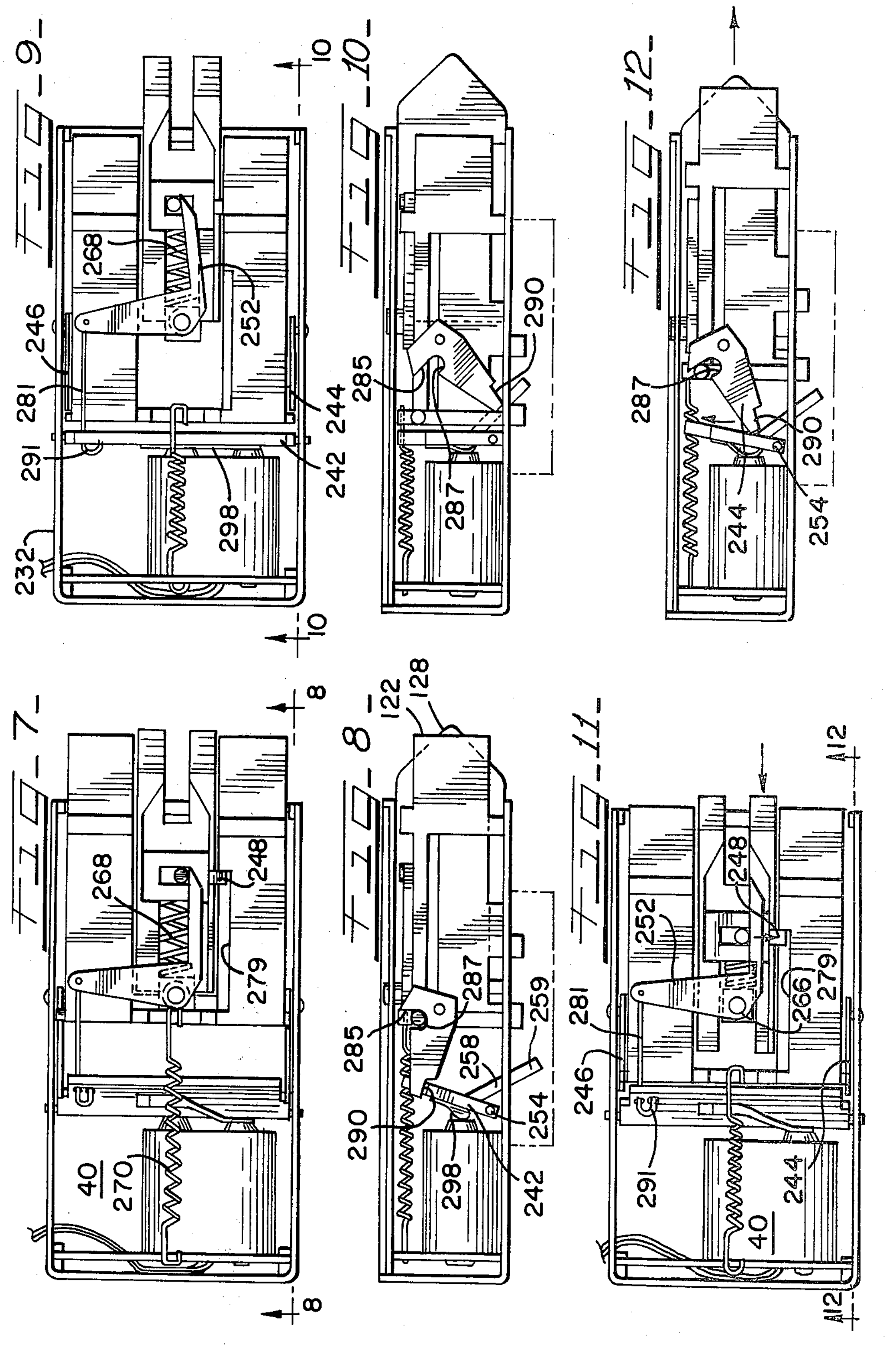
Figure 13:
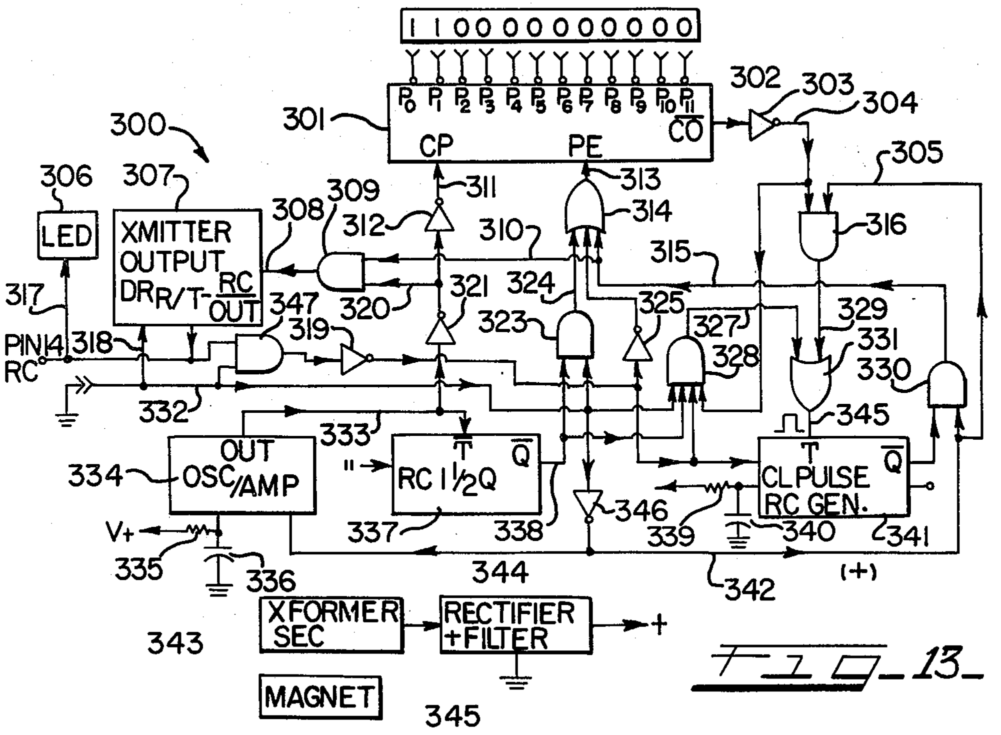
Figure 14:
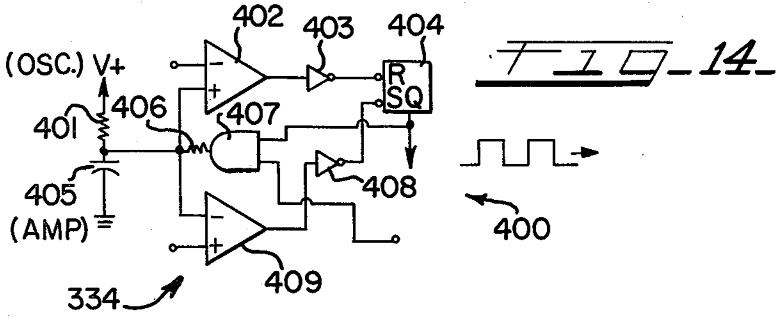
Figure 15:
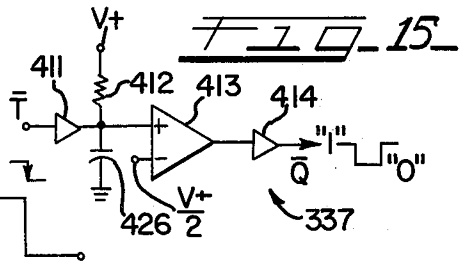
Figure 16:
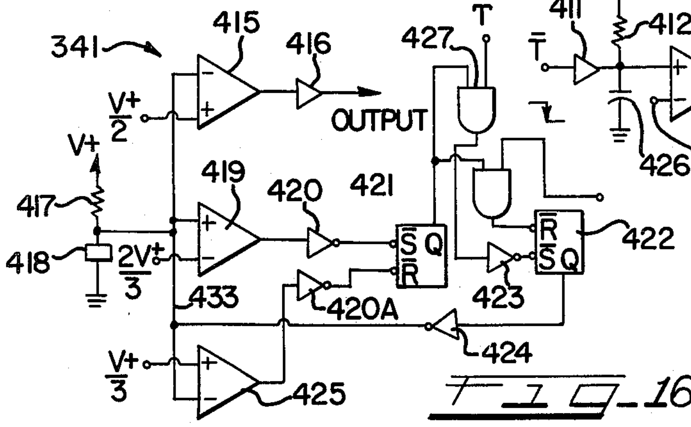
Figure 19:
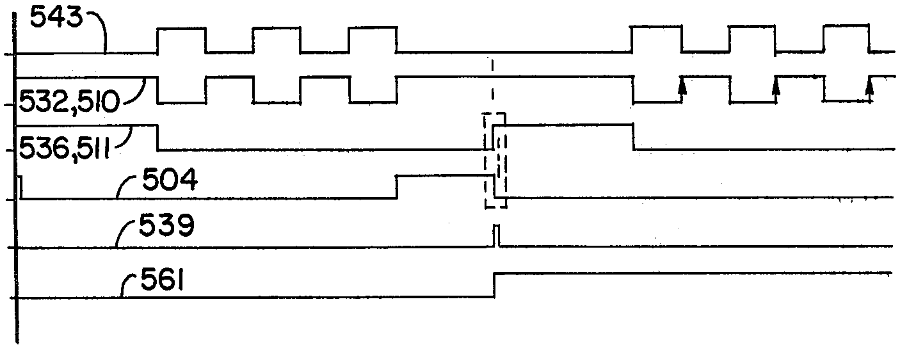
Figure 20:
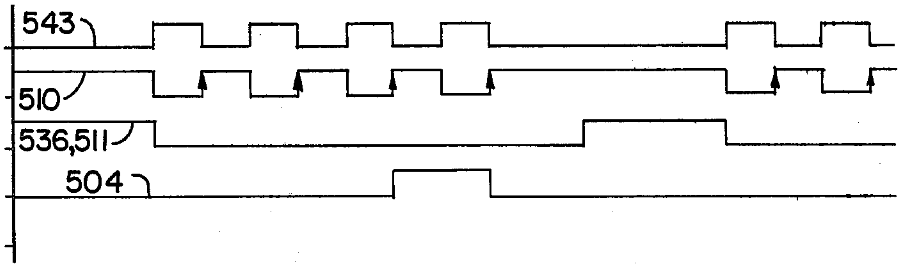
Figure 21:
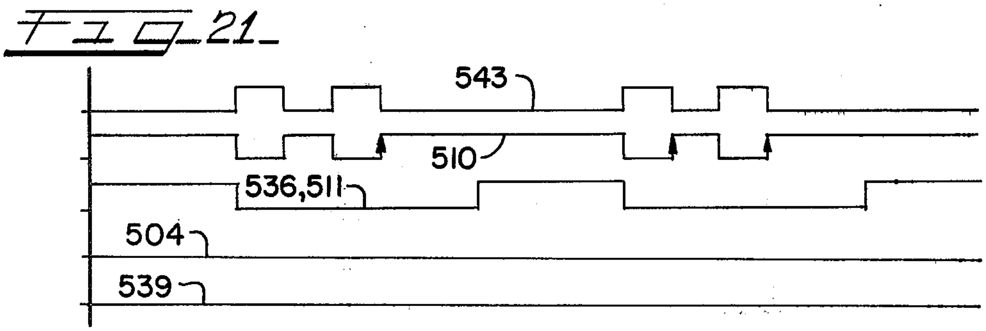
Figure 22:
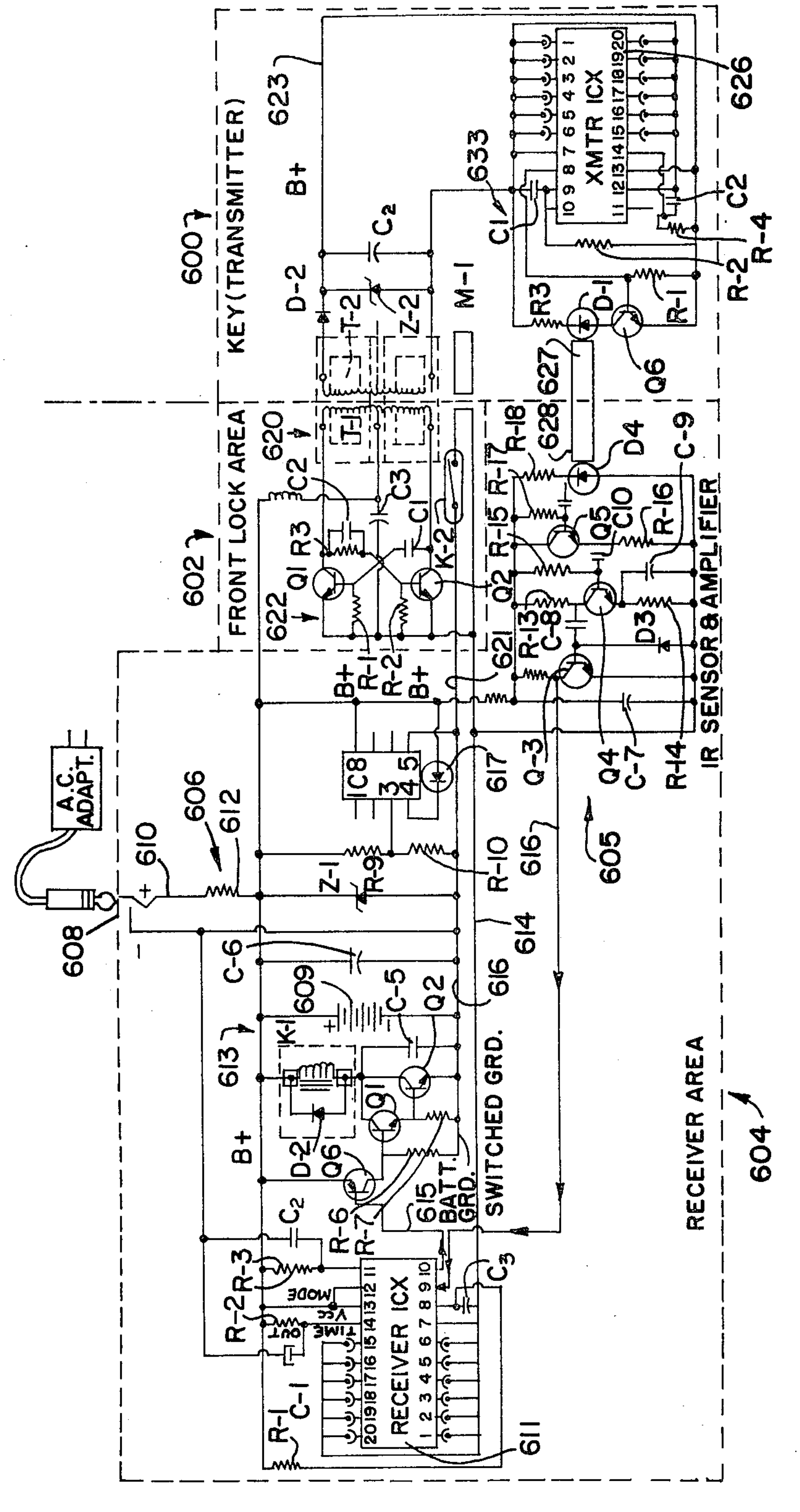
Figure 23:
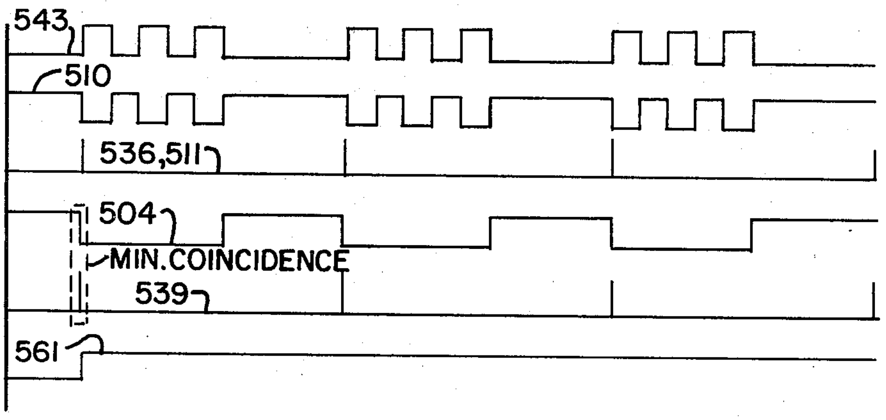
Figure 24:
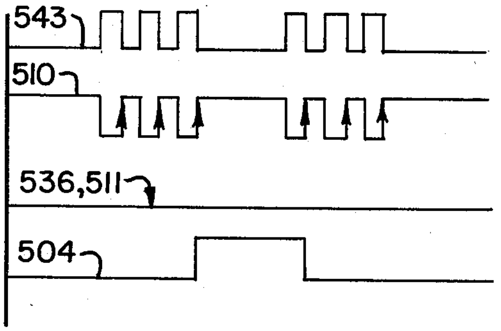
Figure 25:
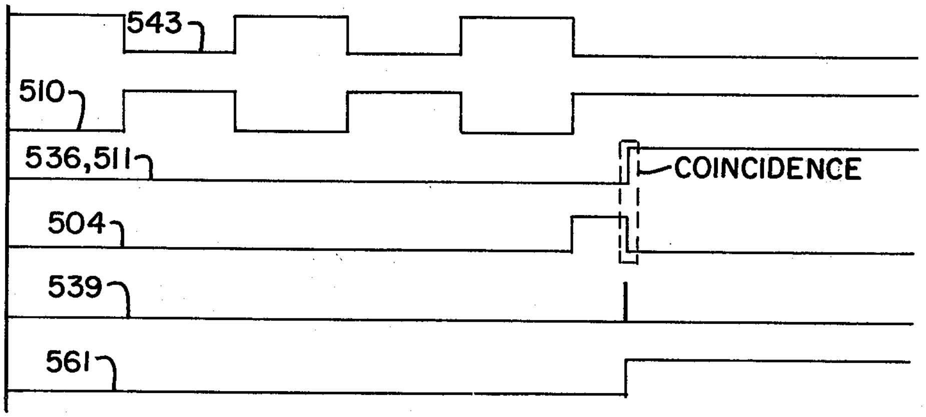
Figure 26:
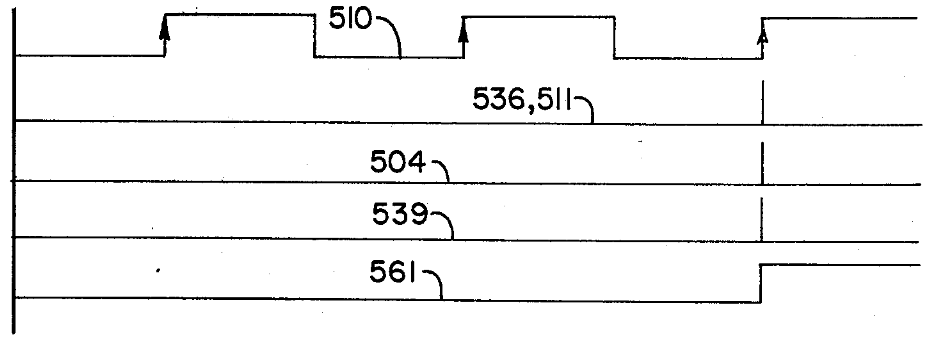
Figure 27:
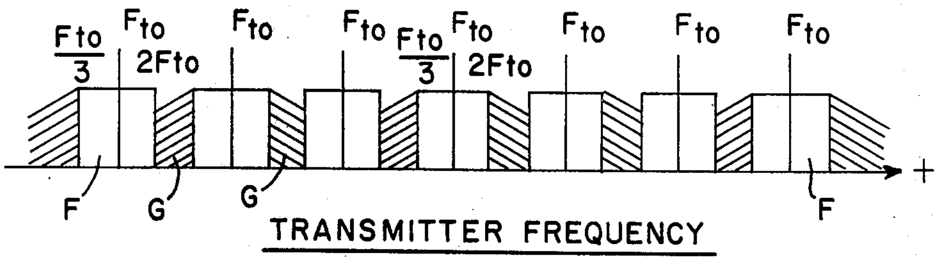

FIG. **3*a* is a front elevational view of the key element shown in FIG. 3**;

FIG. 6 is an exploded perspective view showing the principal operating components of the electromechanical portions of the lock unit of the invention;

FIG. 7 is a front elevational view of the electromechanical parts of the lock unit, showing the mechanism of the locking and unlocking device of the invention in the closed and locked position thereof;

FIG. 8 is a horizontal sectional view of the lock of FIG. 7, taken along lines 8—8 of FIG. 7;

FIG. 9 is a front elevational view similar to that of FIG. 7 but showing the mechanism in another position of use;

FIG. 10 is a horizontal sectional view, taken along lines 10—10 of FIG. 9;

FIG. 11 is a front elevational view, similar to that of FIGS. 7 and 9, but showing the mechanism in a third position of use;

FIG. 12 is a horizontal sectional view, taken along lines 12—12 of FIG. 11;

FIG. 13 is a block diagram showing the logic components of the transmitter of the invention, including an oscillator/amplifier component, a pulse generator element, and a one-shot multivibrator element;

FIG. 14 is an electrical schematic view of the electrical circuit comprising the oscillator/amplifier element shown diagrammatically in FIG. 13;

FIG. 15 is an electrical schematic view of the one-shot multivibrator element shown diagrammatically in FIG. 13;

FIG. 16 is an electrical schematic view of the electrical circuit comprising the pulse generator element shown diagrammatically in FIG. 13;

FIG. 17 is a diagrammatic view showing various wave forms present in different elements of the circuits of the invention from time to time during operation thereof;

FIG. 18 is an electrical block diagram of the logic circuits of the receiver or lock element of the invention;

FIG. 19 is a timing diagram showing the logic states of various components of the circuit when the circuit in the transmitter coresponds to that in the transceiver;

FIG. 20 is similar to FIG. 19 except that it shows a code which is too long being received and rejected by the receiver;

FIG. 21 shows the rejection of a code which is numerically too low being rejected by the receiver;

FIG. 22 is an electrical schematic diagram showing the electrical components of the invention in detail, and further showing the arrangement of one semi-custom integrated circuit in the receiver and one in the transmitter;

FIG. 23 shows the reaction of the receiver to a code which is numerically correct but of an improper frequency;

FIG. 24 shows the reaction of the receiver to a correct code of somewhat greater frequency than that of FIG. 23;

FIG. 25 shows the reaction of the receiver to a correct numerical code with a frequency shift which is moderate but acceptable;

FIG. 26 shows the reaction of the receiver to a frequency shift which is too great to be acceptable; and FIG. 27 shows a preferred allocation of transmitter frequencies so as to provide reasonable receiver bandwidth and also the provision for guard bands between acceptable frequencies.

DESCRIPTION OF THE PREFERRED EMBODIMENTS OF THE INVENTION

While it will be understood that the principles of the inventions may be applied in a number of ways, a description of a preferred form of lock unit will be made wherein a key element is inserted into a receptacle which energizes it and causes it to emit a series of streams of a predetermined number of infrared optical pulses into an associated receiver which includes a sensor and amplifier, a decoder unit, and an output signal generator and amplifier adapted to actuate a solenoid to unlock a novel, three-position lock unit.

For ease of understanding a description will first be given of the general physical arrangement of the lock and key units (FIGS. 1–5). Then, the mechanism of the lock unit will be described in detail (FIGS. 6–12). Thereafter, a description will be made of the logic portion of the key or transmitter unit (FIG. 13), with elements contained therein and shown in FIGS. 14–16 being thereafter discussed in detail. The operation of the key element will then be described, principally with reference to FIG. 17, but with occasional reference to FIG. 22. Thereafter, a description of the receiver unit will be made (FIG. 18) and the operation thereof will be illustrated by reference to FIGS. 19–21. Additional details of other parts of the circuit will then be described by reference to FIG. 22.

When the operation of the form of apparatus shown has been described in reference to a system using a code of fixed but predeterminable frequency, a description will be made of another form of apparatus which uses frequency coding in addition to the pulse code concept.

Referring now to the drawings in greater detail, a preferred form of the invention is shown to be embodied in a lock and key assembly generally designated 100. According to the invention, a dead bolt type locking unit 102 is fixedly attached to the inner surface of a door 104 which is adapted to be locked manually or semi-automatically, and to be unlocked by the use of a key assembly 106.

Referring now to FIGS. 2–5, the lock assembly 102 is shown to include an outer lock assembly housing 108, and a three position operating knob 110. In use, when the door to which the lock unit is attached is closed and secured, the end portions 112, 114 of a dead bolt protrude through and engage apertures 115 in a vertically extending striker plate 120, having right angle flanges 122 secured by fasteners 124 to a door jamb 126. The beveled nose portions 128 of a lock striker extend through a similar, central aperture 125 in the same striker plate 120. It will be understood that the dead bolt which is used to maintain the assembly in a locked condition may move independently of the striker, and that the striker 128 serves to maintain the door in a closed but unlocked position, with the beveled nose surfaces 128 thereon centering themselves within the aperture 125. As will appear, the striker itself is normally resiliently urged to an outward or striker plate-engaging position.

Figure 5:
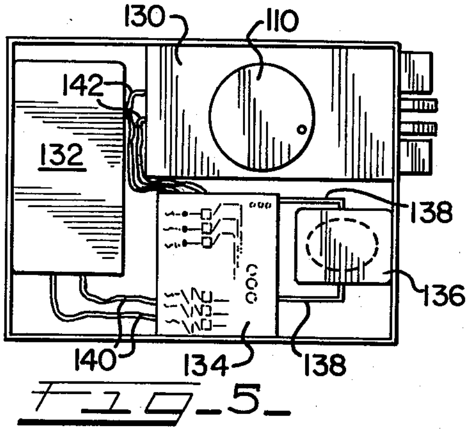
FIG. 5 is a rear elevational view of the locking apparatus of the invention, with the cover removed and showing the power supply as well as the mechanical, optical and electronic components of the unit in positions of use within the lock assembly.

Referring now in detail to FIG. 5, it will be seen that the lock assembly 100 includes other principal elements, including a mechanism housing 130, a battery 132 used as a power supply, a printed circuit board 134, housing the electronic components of the apparatus, and an optical detector unit 136 which is adapted to receive a train of short duration pulses of infrared ("I.R.") light. As shown, the optical detector unit 136 is electrically connected, as by leads 138, to the circuit board 134, which in turn is electrically connected by conductors 140 to the printed circuit board. The dead bolt, which is opened by an electrically operated solenoid, receives power through conductors 142 from the electronic assembly 134.

Figure 4:
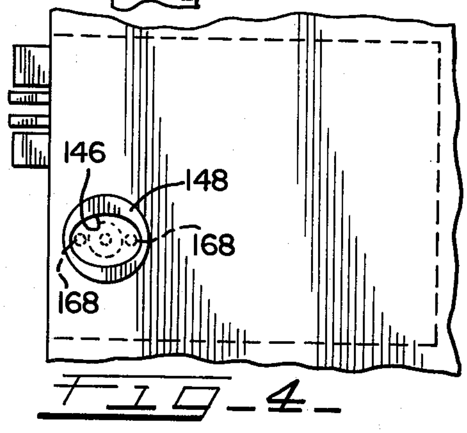
FIG. 4 is a fragmentary front elevational view of a door having the electronic lock apparatus of the invention associated therewith, taken from the outside of the locked door and showing the position and certain elements of the key receptacle.

Referring now to FIGS. 3 and 4, details of the key and key-receiving aperture are shown. The key unit 106 is in generally the form of an elliptical rod adapted for snug but removable reception within the inner surface 146 of a receptacle ring 148. The key unit 106, which includes a key or finger ring 144, also includes a key including a pair of magnets 150, spaced 180° apart when viewed from the front and disposed near the edges of the key 106. A central opening 152 in the key 106 for passage of infrared light, is covered by a larger diameter, infrared transmissive epoxy resin disc 154, as well as by a protective IR transmissive front cover film 156. The key 106 further includes an IR light emitting diode (LED) 158, and a key or transmitter electronics package 160.

The door lock unit includes a tube 162, secured in place by fasteners 164 which extend into and locate the key receptacle ring 148. The tube includes therein an IR-transmissive cover element 166, a pair of magnets 168, a fiber optic light type 170, a "D.C. to D.C. converter" 172, a printed circuit board 174, and a transformer primary winding 173 adapted to cooperate with a transformer secondary winding 174 in the key unit 106.

While the operation of the electronic portion of the invention will be described in greater detail herein, it will be understood that when the key 106 is inserted into the receptacle ring 148, the key magnets 150 cooperate with the door tube magnets 168 so as to close a reed switch which completes a circuit within the receiver of the door lock. This causes the battery to energize the primary winding 173, which is coupled to the transformer secondary 174 located in the key 106. This energizes and presets the electronics in the key, which then sends out a characteristic code of infrared pulses at a characteristic frequency. This stream of pulses is then transmitted through suitable filters and a fiber optic light pipe to the receiver electronics which, if the code is correct, operates a relay which unlocks the door 104.

Referring now to FIGS. 6–12, the mechanism of the dead bolt lock is there shown in detail. As will be apparent from the following operational description, the lock is adapted to have three functional positions. One is an open position, permitting the door to be opened and closed but using the striker as a retainer, another is a completely locked position with the dead bolt in place, and the third position is a preset or so-called autolock position wherein the dead bolt is open, but is adapted to slide to a closed and locked position when the occupant of the room to be locked closes the door so as to actuate the striker.

Referring now in detail to FIG. 6, the locking mechanism is generally designated 230 and is shown to include a lock mechanism housing 232, an operating knob 234, a dead bolt 236, a striker 238, an electromagnet or solenoid 240, a main latch 242, and a pair of side latches 244, 246. The lock also includes a sliding carrier pin 248, a slotted carrier pin cover 250, and a right angle carrier pin operating link or bell crank 252. As shown, a pivot shaft or rod 254 extends through openings 255 in the mechanism housing 232 as well as through a pin bore 256 in the latch plate 242, thereby forming a pivot axis for the main latch plate 242.

Two individual rivets 257 serve as hinge pins for the side latches 244, 246, permitting them to swing through an arc. The construction of the side latches is discussed in detail elsewhere herein. A rectangular opening 258 is provided in a side wall 260 of the mechanism housing 232, to receive the lower portion 58 of a latch-stopping leg 259. The housing 232 also includes a bell or crank mounting post 262 extending outwardly (upwardly in FIG. 6 only) from the wall 260. A cylindrical stub shaft 264 is formed on the top thereof and arranged to fit within the openings 266 in the bell crank 252.

According to the invention, a strong, striker-operating compression spring 268 is disposed between an interior surface of the striker 238 and the surface of the post 262 which faces towards the open end of the housing 232. This spring urges the strikers 238 toward a position of engagement with a striker plate (120 in FIGS. 2 and 3).

The mechanism also includes a second dead bolt withdrawing spring 270, having one end 272 thereof engaged in use with a tab 274 on the backing plate 275 for the solenoid 240. The other hooked end 277 of the tension spring 270 engages a post 278 on the cross member portion 277 of the dead bolt 236. The backing plate 275 is received and held in slots 276 formed in the rear of the housing 232.

From the foregoing, it will be noted that the striker is urged into a position of engagement with the striker plate by the stronger spring 268, while the dead bolt is biased to a retracted position by the action of the less strong spring 270.

Referring now to another important feature of the invention, the dead bolt 236 includes an elongated groove 279 on one surface thereof, with the groove terminating in a right angle shoulder 280, whose function will now be discussed. Referring to FIGS. 7 and 11, it will be noted that an end portion of the carrier pins 248 has engaged the shoulder 280 so that axially outward movement of the striker 238, that is, movement to the right as shown in FIGS. 7 and 11, will cause the dead bolt to be moved with the striker.

In FIG. 9, the bell crank 252 is shown in a position of slight counterclockwise rotation, causing withdrawal of the end portion of the carrier pin 248 from the groove 270 and shoulder 280, thus permitting the striker 238 to move in and out without engaging and carrying the dead bolt 236 with it. Accordingly, when the carrier pin 248 is moved to an engaged position (lowered position as shown in FIG. 11), movement of the striker 238 to the right will carry the dead bolt 236 with it. When the parts are in this position, as shown in FIG. 7, the compression spring 268 is relatively relaxed and both the striker 238 and the dead bolt 238 are in the extreme right hand or locked position.

When the dead bolt is in the maximum withdrawn position, as shown in FIGS. 9 and 10, the striker spring 268 is still in a relatively relaxed condition, but the dead bolt remains to the left by reason of the biasing action of its return spring 170.

Referring now to other important operative connections within the mechanism, a wire link 281 connects one end of the bell crank 252 to a pair of eyes 283 to an upper portion 282 of the main latch plate 242, with the hook 291 in the wire 281 providing for a certain amount of lost motion between the latch plate 242 and the bell crank 252. The dead bolt 236 also includes, on its axially inner end, a pair of stub shafts 284 adapted to engage the locking cam surfaces 285 on the side latches 246. These side latches 246 also include arcuate recesses 287 and anti-return shoulders 290.

Referring now to FIG. 6, the operating knob 234 contains a plurality of inner ramps 285, 292 as well as an open recessed area 288, to which later reference will be made. As will be noted, the operating knob 234 is selectively positionable among at least three different positions.

FIG. 7 shows the locking mechanism of the invention in the fully locked position. In this position, the compression spring 268 urges the striker 238 into a fully engaged position within the striker plate (120 in FIG. 2). The carrier pin 248 is in the engaged position, and because it is engaging the dead bolt 236, the dead bolt 236 is also held as far to the right (FIG. 7) as possible. The compression spring 268 is exerting a locking or right hand biasing force on both the striker 238 and the dead bolt 236, which are coupled together by engagement of the carrier pin 248 with the shoulder 280 in the groove 270. Because the compression spring 268 is stronger than the tension spring 270, which is engaged with the post 278 on the cross member 277 of the dead bolt 236, the tension spring 270, although extended, is not effective to pull the dead bolt back to a withdrawn position.

Further, in the extended position of the dead bolt, the stub shafts 284 have engaged the locking cam surfaces 285 on the side latches 246, causing them to pivot about their axes and into a position wherein stub shafts 285 lie within the recesses 287 and the anti-return shoulders 290 engage the reliefs 291 in the main latch plate 242. Consequently, the dead bolt cannot be moved to the withdrawn or left hand position as shown in FIGS. 9 and 10, because the shoulders 290 are supported against downward rotation by the latch plate 242.

In this connection, it will be noted that, in order for the dead bolt 236 to move to the rear, the stub shafts 284 must clear the recesses 287 in the side latches 246. However, as long as the shoulders 290 rest on the reliefs 291 of the main latch plate 242, the lock cannot be opened.

Referring now to the open position of the lock and the automatic or electro-mechanical manner of achieving it, it will be assumed that the lock is in the position of FIGS. 7 and 8, but that the solenoid 240 has been energized in response to receiving a correct pulse code from the key. This causes the electromagnetic field to draw the main latch plate 242 toward the solenoid 240. As this happens, the main latch rotates about the pivot axis formed by the rod 254, raising the bottom portion 258 of the leg 259 through an arcuate path. At the same time, latch plate movement begins to take up the slcak in the wire 281 prior to operating the bell crank 252.

However, the first portion of this movement of the main latch 242 serves to withdraw the reliefs 291 from the shoulders 290 on the side latches 246, freeing the latch for downward pivotal movement of the shoulders 290 when the stub shafts 284 on the dead bolt are moved to the left as in FIGS. 8 and 10. The shafts 284 push on the sides of the notches 287, rotating the side latches 246 downwardly. During this movement, the free play in the wire 281 permits the bell crank 252 to remain immobile. After the main latch plate 242 has moved far enough to enable the side latches to drop down, further motion rotates the bell crank 252 about its stub shaft 264, withdrawing the carrier pin 248 from engagement with the shoulder 280, and allowing the dead bolt to spring back completely. In the meantime, the striker remains in place, as shown in FIGS. 9 and 10, under the urging of compression spring 268.

In an alternate mode of operation, the dead bolt may be unlocked manually by rotating the operating knob 234. In this case, counterclockwise movement of the knob causes a cam edge 292 to engage the bottom portion 258 of the main latch plate leg 259. This also causes the main latch to pivot about the axis 256, with the above results, namely, the initial release of the side latches and subsequent release of the engagement between the carrier pin 248 and the dead bolt shoulder 280.

At this point, it will be noted that the shoulder 280 and the dead bolt 236 are then positioned so that, even upon extreme rearward movement of the striker unit 238 (FIG. 9), the carrier pin 248 could not engage the shoulder 280. Consequently, in this position, the dead bolt cannot be carried to a forward or extended position by the striker 238.

However, this can be accomplished when desired, as shown in FIGS. 11 and 12. Here, the operating knob 34 is turned 45° from a unlocked position in a clockwise direction. In this mode, another cam 292 on the knob 234 engages a downwardly extending land 294 on the dead bolt 236, urging the dead bolt slightly (0.120 inches, e.g.) to the right or until the nose portions 122 thereof is just flush with or extending slightly outwardly from the housing 232.

With the dead bolt moved to the intermediate position just described, the carrier pin 248 could move into the groove 279 defined by the shoulder 280. However, the striker 238 is still in the extended position as shown in FIG. 9, with the small compression spring 295 urging the carrier pin 248 to an engaged position (downward in FIG. 11).

Consequently, when the operator wishes to leave the area to be locked, having preset the dead bolt as above, he closes the door behind him. Then, the striker plate 120 engages the angularly disposed faces 128 on the striker 238, moving it to a withdrawn position. When this occurs, the carrier pin 248 moves into its position of registry with the groove 279 and the shoulder 280. Subsequently, under the urging of the tightly compressed spring 268, the striker returns forcibly to its fully extended position carrying the dead bolt 236 with it, raising the side latches 246 as the stub shafts 284 engage the locking cam surfaces 285 on the side latches 246, rotating them about their pivot points 244 and raising the shoulders 290 above the reliefs 291 on the main latch plate 242. As this operation occurs, as best shown in FIG. 12, the stub shafts 284 slide into the recesses 287. The solenoid 240 is then de-energized, and the main latch 242, which is mounted for free but limited movement, is moved backward against a slight forward biasing force created by the leaf spring 298. The lock then assumes the fully locked position of FIG. 7, whereupon the cycle, or appropriate part thereof, may be repeated.

Before referring in detail to the electronic circuits of the invention, reference will be made to one very important feature of the invention, namely, that two units of a single-design integrated circuit are used to perform similar or related functions in both the key or transmitter, and in the receiver or unlocking device. At the same time, this single integrated circuit is externally arranged or modified so that certain of its internal components are able to be used to perform functions which improve the performance and security of the system.

For example, one portion of the integrated circuit is able to operate as an oscillator where this is required to create a clocking pulse stream to be emitted from the key. By making different connections to the same circuit, however, it will operate as an amplifier and can thus be used in the receiver.

Similarly, a one-shot multivibrator circuit is used in the receiver as a retriggerable unit which detects an open space of characteristic length between individual streams of coded pulses, and then resets the pulse counter for repetition of the cycle; in the transmitter, the multivibrator circuit is connected differently and not used in this manner. A pulse generator, a still further element of the unit, is also adapted, by the use of different external electronics, to generate a three-pulse blank space between each coded pulse stream emanating from the key, while in the receiver or unlocking device, the time constant or period of the pulse generator is sufficiently extended so as to operate for the duration of one complete pulse stream. In this manner, it can be used as a control for the solenoid which energizes the door unlocking mechanism.

Referring now to FIG. 13, there is shown a logic level block diagram, generally designated 300, of the key unit 106 (FIG. 1) of the electronic lock. Among the various blocks which illustrate the function of the apparatus is a twelve bit, presettable binary counter 301, having twelve "P" outputs, $P_0$, $P_1$, . . . $P_{11}$. Inasmuch as this is a twelve bit binary counter, its capacity is 4096 bits (4095+0). When full, all of the outputs return to logic "0". The counter 301 has a $\overline{CO}$ terminal 302 from which a carry-out (CO) pulse emanates when the counter is filled. An inverter 303 connects $\overline{CO}$ terminal 302 to an output line 304. This line is connected to one terminal of AND gate 316. The counter 301 also includes a terminal 311 for receiving clock pulses (CP) from inverter 312 and a terminal 313 for preset enable (PE).

The logic circuit portion of the transmitter or key 300 includes other principal elements, namely, an IR LED 306, a transmitter output drive 307, an oscillator-amplifier 334, a one-shot, one-and-one-half cycle multivibrator 331, and a pulse generator 341. The lower part of FIG. 13 shows the magnet 345 for the switch, the transformer secondary 343 and the rectifier and filter 344 from which V+ power is obtained, as will appear.

The arrangement of the additional AND gates 309, 347, 323, 328 and 330; the OR gates 314 and 331; and the inverters 312, 319, 321, 325 and 326 are as shown. An RC circuit connects to line 317; line 332 is grounded.

The RC circuit controlling the time constant of oscillator 334 comprises resistor 335 and capacitor 336; output is at line 333. Unit 337 has a $\overline{Q}$ terminal 338 and a trigger terminal $\overline{T}$. Pulse generator 341 has an output terminal $\overline{Q}$, a trigger terminal T (345), a clock pulse terminal CL and its own RC terminal connected to R339 and C340.

Referring now to FIG. 14, there is shown a schematic view of an oscillator generally designated 400, and shown in block form to include resistor 401 and capacitor 405 connected as shown to a positive voltage input, a pair of comparators 402, 409, an AND gate 407, and a pair of inverters 403, 408, the outputs of which are respectively connected to an RS flip-flop having a Q output as shown.

When arranged as shown, this circuit, which is commonly known in integrated circuit technology as a "555" circuit, forms a part of the preferred form of integrated cirucit of the invention and can be made to function as the oscillator 334 in the circuit of FIG. 13. Since the operating principle of this unit is known to those skilled in the art, it will not be further described, except to say that the output thereof is shown to be a square wave output, and that the frequency of oscillation is determined, not by voltages per se, but by the relative proportion of given voltages present in the circuit. In use, one capacitor charges until it reaches two-thirds of V+, where comparator 402 produces a logic 1 to reset the flip-flop 404. The logic 0 of the output flip-flop 404 is transmitted through the AND gate 407, discharging the capacitor to one-fourth of V+. Inasmuch as the capacitors charge only to a certain proportion of the voltage rather than to a given voltage, the proportional voltage difference is always the same and the frequency of oscillation is independent of the supply voltage. In use, this oscillator, when supplied with the system voltage, will oscillate with a characteristic, constant frequency producing square wave pulses in line 333 in the circuit of FIG. 13, as will appear.

Referring now to FIG. 15, a functional diagram of a one-shot multivibrator is shown. In this unit, a buffer 411 is shown to be connected to a resistor 412 having one terminal therof connected to the voltage supply V+, with the other terminal connected to a capacitor 426 with one ground potential terminal. The output of comparator 413, the negative terminal of which is supplied by V+/2 potential, is directed to buffer 414. In use, when the voltage is applied and the RC network 412, 426 is connected, the unit will produce one output of a specified width for every negative-going pulse at the isolating input buffer 411.

The multivibrator shown can be characterized as a retriggerable one-shot multivibrator, insofar as the output of the buffer 414 can be forced to remain in a logic 0 state beyond the normal RC time limit by producing another trigger pulse at the input buffer 411 before the capacitor 426 has charged to one-half V+. Therefore, the output will remain at logic 0 until one RC time after the last trigger pulse has disappeared. This feature is important when the element 337 is used as the receiver, as will appear.

Referring now to FIG. 16, there is shown a functional diagram of a pulse generator corresponding to the generator 341 shown in FIG. 13. The pulse generator is shown to include an input voltage source V+, a resistance-capacitance circuit 417, 418, and three comparators 415, 419, and 425, arranged as shown. The comparator 415 has an output through buffer 416, while the output of comparators 419 and 425 passes respectively through inverters 420, 420A, being then directed respectively to the $\overline{S}$ and $\overline{R}$ terminals of the flip-flop 421.

The Q output of the flip-flop 421 is directed to a pair of AND gates 427, 428. The trigger pulse signal may be delivered to the other terminal of the AND gate 427, while the other terminal of AND gate 428 may receive a negative-going clock pulse as shown. The output of AND gate 427 passes through inverter 423 to the $\overline{S}$ terminal of the flip-flop 422, with the AND gate 428 being connected to the other or $\overline{R}$ terminal of the flip-flop 422. The Q output of which passes through inverter 424 and back to the line 433, which is in turn connected to the comparator nodes as shown.

As will appear from the following description, the operation of the pulse generator is different in the transmitter circuit than in the receiver circuit, being made to serve the function of creating a three-pulse width space in the coded signal when used in the transmitter, and being used in the receiver with an RC circuit of a longer time constant, to control solenoid operation during at least one complete pulse stream reception and decoding cycle.

Referring now to the lock or receiver portion of the electronic circuit of the invention, and in particular to FIG. 18, a block logic circuit is shown which is very similar to that of FIG. 13, the individual components of which will therefore not be discussed in great detail. However, the major components of the circuit, which are arranged as shown, will be briefly described.

As shown in FIG. 18, the circuit contains a 12 bit binary counter 501, having a clock pulse input terminal 510 and a preset enable input terminal 511, together with a carry out pulse terminal ($\overline{CO}$) 502. The unit contains the output driver 506, the oscillator-amplifier 544, the one-shot, one-and-one-half cycle multivibrator 535, and the pulse generator 550. The oscillator-amplifier 544 includes an input terminal 543, receiving a signal from the IR sensor and amplifier 551, which in turn receives its signal from the source through an infrared filter 542. The output of the oscillator-amplifier 544 is fed to an output terminal and to line 532, which is then directed to the $\overline{T}$ trigger (input terminal of the multivibrator 535). This unit also is operatively connected, at its RC input terminal, to the resistance capacitance units 533, 534 shown. The output of the multivibrator occurs at the $\overline{Q}$ terminal 536 where it is fed to the AND gates 520 and 523. The pulse generator includes an RC input terminal receiving its signal from the RC circuit 548, 549, includes a clock pulse input terminal $\overline{CL}$ 538, a trigger pulse input terminal 539, and a $\overline{Q}$ output terminal 541, as well as Q output terminal 561.

Accordingly, in the $\overline{Q}$ output stage, AND gate 528 is enabled while in the Q output logic state, the solenoid driver 557, and, accordingly, the locking device 556, are energized. In the remaining portions of FIG. 4, the additional AND gates 508, 513, 528, and 560 are arranged as shown; the inverters 509, 516, 519, 521, and 537 are connected as shown, as are the OR gates 512, 540.

FIG. 18 also shows other features to which reference will be made, namely, the reed switch 546, the magnet sensor 545, and a rechargeable battery 555 for supplying the voltage at the V+ terminal. The power circuit 553 and the transformer 552 are arranged as shown, it being understood that reference to the detailed circuitry of these units is shown in FIG. 22 and description thereof appears elsewhere herein.

The battery monitor circuit, comprising a positive voltage input terminal and an integrated circuit terminal represented as unit 559 is shown to operate a flashing LED 558 in a manner which will also be described. In the circuit of FIG. 18, the oscillator-amplifier unit 554 is connected so as to act as an amplifier for the incoming signal received by the infrared sensor and amplifier; i.e., pulses received therein are amplified and transmitted to the inverters 519 and 510 to the counter 501.

The one-shot multivibrator 535 has a suitable time constant which is one-and-one-half times that of the characteristic frequency of the clock pulses being received and is retriggerable. Therefore, failure to receive a timely negative-going pulse will enable the multivibrator to produce a pulse directed to the preset enable terminal of the counter 501. This determines whether the counter 501 is filled and hence determines if the coded signal is correct.

The pulse generator 550 is arranged with an RC circuit so as to have a long enough duration so that, when this unit is enabled and emits a pulse at the Q terminal, the solenoid driver circuit will be actuated for a period of time at least equal to the time required for a stream of clock pulses to be received and analyzed. Accordingly, as long as the lock unit is in the key and a correct code is being sent, the pulse generator 550 will enable the solenoid driver over and over, without an inactive period. Accordingly, although the actual duration of the pulse generator is short in real time, it is long in relation to the pulse width of the incoming pulses, and accordingly, the key will operate as just described.

Referring now to FIG. 22, there is shown an electrical schematic diagram showing the electrical components used in certain elements of the invention. As will appear, certain of these elements, or parts of them, form parts or elements of the circuits shown in FIGS. 13–16 and 18; the duplication of these parts is explained herein. In FIG. 22, the dotted lines separate the key or transmitter area generally designated 600 from the front lock area generally designated 602, and in turn separates these areas from another major area, the receiver area 604, which includes within it the IR sensor and amplifier 605.

As shown, the receiver area 604 also includes a power supply section generally designated 606 and shown to include a rechargeable battery 609, adapted to act as a power source for the unit, and to be recharged and/or maintained at a satisfactory charging level by the provision of a plug 608 which is receiveable within a jack 610 in the receiver and which in turn receives its power from an AC adapter. This area also includes a current limiting resistor 612 and a Zener diode Z-1, which regulates the charging voltage of the battery 609. Capacitor C6 acts as a filter in the charging circuit and also filters line 613 and the circuits served by it against excess "noise", cooperating with choke 623 in the function.

The receiver electronics section includes the receiver integrated circuit (ICX) package referred to above and elsewhere herein. The receiver integrated circuit 611 is in a 20-terminal dual in-line package having the numbered terminals shown and is connected across a switched ground line 614 and a B+ line. The switched ground line 614 is connected to a battery ground or negative line 616 controlled by a reed switch K2. When the switch K2 is closed, the switched ground line is connected to the battery found line and the circuit is activated.

Referring again to the integrated circuit, pins 1–6 and 15–20 correspond to the twelve bit counter, while the additional lins comprise the time out line 14, the $V_{cc}$ line 13, the mode line 12, and an RC network, resistor R3 and capacitor C2. The time out line includes capacitor C1 and resistor R2. A table showing the values of these components is reproduced elsewhere herein.

Terminal 9 receives the signal from the IR sensor and amplifier 605 (also 551 in FIG. 18); terminal 8 is connected to capacitor C2 and resistor R1; terminal 7 is connected to the switched ground line; and receiver integrated circut terminal 10 is connected to line 615, the pulse generator output line, which is also the same as line 561 in FIG. 18.

Another principle element of the apparatus is the unlocking mechanism per se, designated 613 in FIG. 22, and shown to include transistors Q1, Q2, and Q6, resistors R6 and R7, diode D2 and capacitor C5. When an appropriate signal on line 616 is fed to the receiver ICX, assuming it to be a correct signal, the line 615 from terminal 10 is amplified respectively by transistors Q6, Q1, and Q2, with the result that the inductor K1 is energized. The inductor K1 and its associated core form the solenoid shown as 240 in FIGS. 6–12.

Still another portion of the circuit of FIG. 22 is the battery status indicator section. This circuit includes resistors R9 and R10, and LED 617 with a built-in flashing circuit (FRL-4403), and an integrated circuit "IC-1" with PINS or terminals 3, 4, 5 and 8 thereof connected as shown.

The integrated circuit IC-1 is a commercially available micropower operational amplifier (8211-CPA) with a temperature stabilized internal reference voltage. In use, it compares the voltage at PIN 3 with a preset voltage, in this case 4.75 V. If the PIN 3 voltage falls below desired levels, pin 4 goes low, allowing B+ voltage from the line supplying pin 8 to energize LED 617, which will then flash as an indication that the battery should be recharged. The battery status monitor or indicator is the only portion of the circuit which operates continually, but by reason of using an integrated circuit IC, the current drain is negligible even when the flashing occurs for a period of a week or more.

Another principle portion of the circuit of FIG. 22 is the IR sensor and amplifier circuit 605, which includes a photodetector in the form of a PIN diode D4, operating in a reverse bias mode, and generating its output signal across load resistor R18. Transistors Q3, Q4, and Q5; diode D3, resistors R12 to R18, inclusive, and capacitors C7 to C11 are arranged as shown.

In the operation of this sytem, the coded sequence of pulses is directed to the PIN diode D4 through the light pipe 528. This PIN diode D4 has an exceptionally fast response time, and the signal is capacitively coupled to the input of the emitter follower Q5 through capacitor C11. The output from transistor Q5 is coupled to the voltage amplifier Q4 by capacitor C10. The transistor Q4 supplies almost all of the gain of the amplifier system, while transistor Q3 receives the amplified signal though the coupling capacitor C8. This stage acts as a level shifter and assures that signals of the correct voltage are present at the input of the receiver integrated circuit 611, to which the signal in the emitter-collector circuit of transistor Q3 is fed through line 616.

Referring now to another principal element, which can be termed the "front lock area electronics", 602 shown in FIG. 22, this is the portion of lock assembly which is disposed physically adjacent the key receptacle. Area 602 includes a cup core transformer generally designated 620 comprised of a center tapped primary winding T1 and a secondary winding T2. A bar magnet M1 is positioned so as to activate reed switch K2, so that the switched ground circuit 614 will be completed when the key is in the receptacle. The front lock area power for the transformer 620 is derived from a multivibrator or oscillator generally designated 622 and which includes transistors Q1 and Q2, resistors R1 to R3, and capacitors C1 to C3, arranged in a conventional manner as shown in FIG. 22. Inductor 623 in the line between the primary center tap and the battery positive voltage (B+) line operates as a choke to suppress "noise" in line 613. In the preferred form, the transformer includes a pair of cup cores, one in the receiver and one in the transmitter. In this core, the secondary is referred to as the transmitter core because of its association with the key which transmits a pulse stream to the receiver. However, it will be understood that, as far as the transformer is concerned, the transmitter actually receives power to operate the key which transmits light pulses rather than transmitting measurable power.

Referring now to the transformer secondary and power supply area, this includes rectifier diode D2, Zener diode Z2 adapted to protect the transmitter IC from damaging transcient high voltages, and filer capacitor C2. Line 623 is a regulated and stabilized battery voltage line which supplies the transmitter integrated circuit 626 (XMTR ICX) and associated transmitter electronics 633, including transistor Q6 and the IR LED, D1.

In this circuit, resistors R1 to R4, inclusive, and capacitors C1 and C2 are arranged as shown. The transmitter integrated circuit 626 includes 20 pins, of which 1–6 and 15–20 are for the 12 bit counter (401 in FIG. 13) and of which pins 7–14 are for the lines indicated below:

7—ground;

8—output signal to base of amplifier transistor Q8;

9—oscillator;

10—receiver output (not connected);

11—½ RC (not connected);

12—mode (grounded);

13—$V_{cc}$ (or B+);

14—timing output.

As explained in detail elsewhere, the transmitter integrated circuit, once energized, puts out a predetermined stream of pulses at a characteristic frequency with a three-pulse gap between each series of signals. These characteristic signals are created as pin 8 (oscillator output) controls base of transistor Q6, causing light-emitting diode D1 to send an encoded signal through fiberoptic light pipe 627. From here, the signal passes to its counterpart light pipe 628 in the receiving section.

Referring now to the operation of the electronic aspects of the invention, it will be assumed, for purposes of explanation, that the code preset into the 4096 unit counter is 4095-3, i.e. 4092, so that when the three-pulse unit correct code is received, the receiver counter 501 will be entirely full but will not overflow. To cooperate with the receiver counter 501, the transmitter counter 301 will be similarly programmed so that it will send a series of three-pulse trains, each interrupted by a three-pulse blank space.

In this connection, it will be appreciated that the fact that the three-pulse blank space or inter-"word" space and the code are both of a three-pulse duration is merely coincidental. As will appear, the three-pulse space separates all transmissions, regardless of their length.

When the counters 301, 501 (also portions of ICX 626 and 611) are coded as above, they will be preset to the 4092 value when their preset enable terminal are energized.

Assuming now that the user places the key 106 within the receptacle ring 148, and that the magnets 150 are aligned with the magnets 168, the switch K2 (FIG. 22) will be closed. The cores of the transformer 620 are also placed in physically adjacent relation by insertion of the key. Closing the switch K2 applies power to the receiver area, enabling the presets and charging the various capacitors. Power in the switched ground line activates the oscillator 622, creating an AC signal in the primary T1 of the transformer 620. The secondary T2 is energized, and rectified and regulated power passing through diode D2 and capacitor C2 appears as B+ power on line 623, charging the capacitors shown and presetting the transmitter integrated circuit 626.

Prescinding now from the operation of the logic in the integrated circuits, and referring to the electronics of FIG. 22, it will be assumed that a characteristic three-pulse code, separated by the three-pulse open space, is being sent from the transmitter IC PIN 8, with such signal being impresses on the base transistor amplifier Q6. IR LED D-1 emits a coded pulse signal which is passed between aligned light pipes 627, 628 to the PIN diode D4 of the IR sensor and amplifier 605. The amplified and transduced signal is fed to pin 9 of ICX 611 through line 616, where it is determined to be the correct code. A correct code creates an appropriate signal at pin 10, energizing transistor amplifiers Q6, Q1, and Q2, and applying battery power to the solenoid K1. As described this solenoid is the solenoid 240 of the lock shown in FIGS. 6–12. Energizing the solenoid withdraws the latch plate and opens the lock as explained above.

If the code received does not correspond with the code preset in the receiver, the solenoid is not energized and the lock does not open.

Referring now to the logic diagrams, reference will again be made to FIG. 13, which illustrates the key or transmitter logic. First, it will be understood that the $V_{con}$ line 332, which corresponds to pin 12 in FIG. 22, has been grounded. Grounding of the line 332 has also disabled the AND gate 323 and enabled the AND gate 328. It will be further assumed that the RC terminal of the multivibrator 337, which is the same as that shown in pin 11 of the transmitter IC, is not connected, thus preventing the multivibrator from operating. It will now be assumed that the unit 334 is operating in the oscillator mode, producing clock pulses at the output terminal as shown. The RC network 335, 336 determines the frequency of these clock pulses. As long as power is present in the key, the oscillator 334 will continue to emit synchronous clock pulses of the pattern shown in line 311 of FIG. 17.

Depending upon the condition of the counter 301, the counter will eventually fill up, and when full, will cause a carry-out pulse to appear at $\overline{CO}$ terminal 302. This carry-out pulse will pass through the inverter 303, becoming a positive-going pulse in line 304, passing to AND gate 328 and to trigger pulse terminal 345 of the pulse generator 341.

It will also be assumed that the quiescent state of the pulse generator is a logic "1" level at the $\overline{Q}$ terminal. The logic "1" state appearing at the Q of the pulse generator 341 passes through AND gate 30 to node in line 315, and thence to AND gate 9. With the line 310 being a continuous logic "1" level, clock pulses passing through inverter 321 and into line 320 will pass through AND gate 309 into line 308 and the LED 306.

Accordingly, when the pulse generator is at logic "0", the AND gate 309 is disabled for three pulse intervals. Consequently, LED 306 is not driven and an three-cycle blank space will be created; this space divides the pulses into trains of a coded length.

After the blank space is created as described, the pulse generator resets to logic 1, presetting the counter 301 through the preset enable terminal 313. The next positive-going pulse also gates output pulses through AND gate 309 again, and the LED again begins its signalling at the characteristic frequency of the oscillator 334. The signal on line 315 returns to logic 1 at a point midway between the positive-going edge of pulse 1 and pulse 4093, and consequently the presetting and clocking operations of the counter do not interfere with each other.

Referring again to the pulse generator 341, this is a triggered oscillator and would cycle between logic 0 and logic 1 if the trigger voltage were not removed before the start of the next output cycle. However, this trigger pulse is removed by the continuous application of clock pulses to the counter 301. When the counter overflows, line 304 returns to logic 0, removing any pulse from the trigger terminal 345.

Thus, the triggered oscillator 341 acts as a one-shot multivibrator producing a cycle for each logic 1 application at its trigger input terminal. FIG. 17, in the broken line area, shows the safe range of preset times for the counter, and as long as the time constant of the RC circuit 339, 340 falls in this area, the presetting operation will be carried out satisfactorily.

It will be understood, that no matter how many pulses are transmitted as the code, from one up to 4095, there will always be a blank space of three clock cycle pulse duration between each transmission of the code, simply because the counting is interrupted for this period of time as determined by the RC circuit of the pulse generator. The transmissions will continue as long as the key is in the receptacle inasmuch as the oscillator operates continuously when the transmitter is energized.

FIG. 17 shows the wave forms existing from time to time in the various lines or at the various terminals of the transmitter unit. The first line, designated 311, shows that clock pulses are continuously being supplied to the CP terminal of the transmitter counter 301. The second line, designated 304, 345, shows that when a positive-going pulse appears in these lines which is of full cycle duration, i.e., twice the width of a positive pulse in line 11, the pulse is negative-going each time a counting cycle starts. When line 345 goes positive, this enables the pulse generator 341, and causes the output of the generator 341 to go low, disabling the AND gates 330 and 309, sending terminal 313 low, and disabling the LED 306 so as to create a gap or dead space between pulse trains. The length of the gap is determined by the $R_3C_3$ time constant of the generator 341. The third line shows conditions in lines 310, 313, and 315, showing that when the last pulse 4095 goes positive, lines 310, 313, and 315 go to a logic 0 state. The next line of FIG. 17 shows the characteristics in line 320, which contains the same but opposite sense wave form as that in line 311, by reason of the inverter 321.

The ultimate result is the output wave form appearing in lines 308 and 317, the bottom line of FIG. 17, and the lines which control the energizing of the transmitter LED.

Referring now to the operational logic of the receiver, it will be noted that its logic circuitry (FIG. 18) is very similar to that of FIG. 13, except that some external portions of the circuit are different, and that some internal portions are not used, or are used differently. Thus, unit 544 is arranged in FIG. 18 so as to operate as an amplifier. The one-and-one-half cycle, one-shot multivibrator is provided with an external RC circuit at its RC terminal. In addition, the pulse generator 550 is arranged so as to function as a triggered astable multivibrator having a time constant of relatively increased duration.

Considering the circuit of FIG. 18, it will be assumed that line 531 is now connected to the control voltage $V_{con}$ of the circuit; that RC networks 533, 534 have been connected to the multivibrator 535, and that RC circuit 548, 549 has been added to the pulse generator circuit 550 just described.

In operation, a filtered signal received from the IR sensor and amplifier 551 is passed to unit 544, which acts as a further amplifier, sending a train of pulses through inverters 519 and 509 to the clock pulse terminal 510 of the receiver-counter 501. After the three bit correct code has been furnished, a blank space will occur in the transmission sequence. As a result, the one-and-one-half shot retriggerable multivibrator is enabled, a short time after an anticipated pulse is not received. Logic 1 will then appear on line 356, and logic 1 will appear on line 511, presetting the counter; however, this appears in the approximate middle of the three-pulse cycle. At the same time, the first negative-going edge of the signal on line 532 causes the multivibrator to produce a logic 0 in line 536. This logic appearing in line 511 enables the counter to respond to the following positive-going edge. Subsequent pulses keep the line 536 at logic 0, permitting the counter to continue counting the input pulses. If the correct number of pulses is transmitted to the receive, the counter 501 will eventually fill up and not overflow. When the counter 501 is full, line 504 will go to logic 1, and if no more input pulses arrive, will remain at logic 1. Because no more pulses appear immediately on line 501, the one-shot multivibrator 535 will complete its output cycle and again produce a logic 1 on line 36. Because line 504 must be at logic 1 before line 536 goes to a logic 1, and because line 538 is in logic 1 because of the resistor 529, the AND gate 523 produces logic 1 on line 539. This enables the pulse generator circuit to create an output at the Q1 terminal, line 561, energizing the solenoid driver and unlocking the lock.

If incorrect pulse codes have been sent, the solenoid will not open. For example, if too many pulses are sent without interruption (the improper numerical code is too high), the counter 501 will fill up and overflow before the $\overline{Q}$ output of the one-shot multivibrator 535 can go to logic 1. Thus the logic 1 carry-out pulse in line 504 will be lost before it can be used to activate the pulse generator circuit 550.

If the false code is numerically lower than the true code, two pulses will be received within the interval in question, and the counter 501 will never fill up. As the counter 501 takes on additional pulses but is preset before filling up, the logic 1 will never be generated as a carry-out pulse on line 504, and accordingly, there will be no activation of the pulse generator 550. Because of the three clock cycle blank space inbetween trains of pulses, the one-shot multivibrator 335 can complete its output cycle in preparation for testing the next transmission.

The manner in which the correct codes cause the lock to open, and incorrect codes cause it to remain locked, is shown in FIGS 19–21. In FIG. 19, the signals in lines 543; lines 532 and 510; lines 536 and 511; line 504; line 539; and line 561 are shown, respectively, from the top of the figure to the bottom. As shown, the three-pulse code with the three-pulse interval is transmitted from the IR sensor and amplifier into the receiver amplifier 544. Because of the invertors, the same code with opposite logical states appears in lines 532 and 510, filling up the counter 501 while each succeeding pulse resets the retriggerable oscillator 535. When the oscillator is not retriggered, as shown in the middle of the third line, because no clock pulse appears, it goes to logic 1, one-and-one-half pulse widths after the last negative-going edge of a clock pulse defining the open or inter-train blank space is received, thereafter going high after its predetermined time period and thus resetting the counter 501.

When the next pulse appears, the oscillator or multivibrator 535 is retriggered and goes low, and so does the logic state of lines 536–511. The carry-out pulse in line 504 goes positive when the counter is full and then negative when the counter is reset. The pulse generator is enabled by the signal in line 539, causing the Q output of the pulse generator 550 to go high as shown at the bottom of FIG. 19 (line 561). This is the solenoid driver line, and when line 561 stays high, the lock, having received the correct code, is opened.

FIG. 20 shows the same conditions and waveform numbering except that line 543 now sees a four-pulse code. However, in this case, the signal in line 536 (and hence in line 511) does not coincide with the signal in line 504, and hence the locking device stays closed. In other words, the multivibrator was being retriggered into a 0 logic state during the time the carry-out pulse went high. Subseqeuntly, the carry-out pulse in line 504 from the counter 501 went low before the multivibrator had an opportunity to go high, which could only occur after an inter-train duration of at least one-and-one-half pulses. Accordingly, it will be seen that the lock does not open where the numerical code is wrong, even though the three-phase space between pulse trains is provided.

FIG. 21 shows a numerically lower code in line 543; the code in 510 is the same numerically but of opposite logic, and the situation in lines 536 and 511 is shown, i.e., the cycling of the multivibrator during the inter-train interval. Here, however, lines 504 and 539 remain at logic 0 because the correct number is never attained in the counter. In other words, the counter is reset by the pulse in line 511 over and over before the counter fills, with the result that no carry-out pulse appears in line 504. With no carry-out pulse, the pulse generator can never be triggered and the lock remains unopened.

Another important feature of the invention is that while the receiver unit has a definite tolerance for slight variations in frequencies, such as those which would be occasioned by the presence of manufacturing tolerances, temperature differences, etc., the units also are designed so that when an intentional change is made in only a few components, such as those needed to change the frequency of the transmitter oscillator and the time constant of the retriggerable oscillator, and when counterpart changes are made in the one-shot multivibrator of the receiver (such changes being able to be made by altering the RC or time constants of these components), the unit is capable of being coded by frequency as well as by the number of pulses in each train.

Hence, using the simple low-cost components referred to herein, it is possible to use, for example, seven different frequencies, each of which has its own tolerance or bandwidth, and each of which is also separated from an adjacent bandwidth by one or more guard bands.

Reference will now be made to FIGS. 23–27 to illustrate acceptable and unacceptable frequency variations, and the manner in which these frequencies are dealt with by the circuits of the invention.

Referring now specifically to FIG. 23, the numbers given to the waveforms are the same as those used in FIGS. 17 and 19–21. Thus, the signal received by the receiver ICX comes through line 543, and is the preset three-pulse code with the three-pulse dead or inter-train space following it. Line 510 sees the same code, but with opposite logic states, and this is the signal received by the counter 501.

The signals in lines 536 and 511 are merely spikes, representing the fact that the multivibrator goes high and is instantly reset, while the output in line 504 is that resulting from filling and resetting the counter. Line 539, which is the signal into the pulse generator, must have at least the minimum coincidence illustrated with the signal in carry-out line 504 in order to energize the pulse generator and actuate the solenoid driver.

The signal illustrated in FIG. 23 has the correct pulse code numerically, but has the highest frequency which the receiver can accept and still energize the solenoid driver. In this case, a multivibrator output pulse must be generated within the three-pulse, inter-train duration. With the RC or time constant of the one-and-one-half cycle multivibrator remaining constant there is still time for the multivibrator to be triggered as long as the inter-train space is equal to or greater than the time constant of the multivibrator. With a one-and-one-half cycle time constant and a three-pulse dead space, these conditions can be met as long as the frequency is increased to not more than double the preset frequency. If the inter-train pulses were shorter, the multivibrator would be repeatedly retriggered before going high and would never emit a signal.

As long as the multivibrator is able to operate for one of its cycles, and as long as the counter can be reset, however, the pulse generator can be energized as appears in FIG. 23.

Referring now to FIG. 24, the further increased frequency condition just referred to has occurred, that is, the signal in lines 536 and 511 always remains at logic 0 because the multivibrator is always retriggered into a logic 0 state by a series of pulses before it can go high. In other words, the dead band or inter-train space is of such duration that retriggering always occurs before the multivibrator is enabled.

Because there must be a logic AND condition between the multivibrator and the counter preset enable, the pulse generator is never energized even though, as FIG. 24 shows, the carry-out pulse appearing on line 504 is generated periodically in response to the correct numerical signal.

From the foregoing, it can be appreciated that the high side of frequency tolerance in the illustrated receiver is $2F_{to}$, that is, twice the transmitter output frequency.

FIGS. 25 and 26 show a reduced frequency and the effect thereof, again showing the conditions prevailing in the lines numbered 543; 510; 536 and 511; 504; 539; and 561. (FIG. 26 does not show the waveform 543).

Again, the numerical code is correct and the counter line 510 sees the opposite hand logic but the same numerical pulse sent by the receiver and which, in the illustrated case, is correct. When the inter-train dead space occurs, the multivibrator is enabled and presets the counter 501. Because of the correct numerical coding, a carry-out pulse is generated as shown in line 504 and line 539, going positive in response to the coincidence of the carry-out pulse and the counter reset. With the signal being received from line 539, the pulse generator is enabled, creating a positive-going or enabling signal in the line 561. This signal is suitably amplified and operates the solenoid to open the lock.

In FIG. 25, the frequency is one-half of the normal frequency. Here, the one-shot multivibrator 535 has much more time to complete its output cycle and generate a positive-going pulse in lines 536 and 511, and in fact, it almost presets the counter 501 before the counter 501 has registered the last pulse of the transmission. There is just enough time, therefore, for the short spike in line 539 to trigger the pulse generator 550 and create a positive signal in line 561 to energize the solenoid and open the lock.

FIG. 26 shows the operation of the receiver when attempting to receive the lowest possible frequency, namely, $F_{to}/3$, or one-third of the numerical design frequency.

In FIG. 26, when the frequency is one-third of the normal or design frequency, the one-shot multivibrator 535 completes its output cycle at the same time the counter 501 has registered the last pulse of the coded transmission. Under these conditions, triggering of the pulse generator 550 is marginally stable because of the requirement of signal coincidence required to gate the various logic components within the receiver.

FIG. 26 shows only spikes in lines 536, 511; line 504; and line 539, with the spike 539 being that required to trigger the solenoid driver through line 561. While FIG. 6 shows that line 561 goes positive, at the frequency in question, it is not really certain that this would occur. Thus, FIG. 26 merely shows that any reduction of the frequency beyond that would definitely disable the system. From the above, it has been shown that the inventive system using the concept of the fillable counter, the carry-out pulse, and the retriggerable oscillator with the logic described, inherently creates frequency coding protection as well as a tolerance latitude or operating bandwidth lying between twice the design frequency and one-third thereof.

Referring now to FIG. 27, there is shown schematically a series of frequencies F, having a design frequency $F_{to}$ and margins defined by frequencies $F_{to}/3$ and $2F_{to}$, establishing the illustrated bandwidth. The shaded areas G are guard bands lying between these sets of individual frequencies.

FIG. 27 shows seven circuit frequencies. Accordingly, a key and lock system having a 12-bit binary counter and seven ranges of individual frequencies would provide a lock system having a grand total of 4,096 times 7, or 28,678 possible combinations.

Referring now to another feature of the invention, it is known that the photosensor used in the receiver is sensitive to both visible and invisible light. Accordingly, it is absolutely necessary to filter the input light so as to remove any possibility that extraneous light source inputs could alter the operation of the key unit. The usual types of optical band pass filters suitable for the infrared light used in this system are regularly obtainable articles which can be purchased from known sources. However, the types of filters normally used for these wave lengths are quite expensive and are very fragile, especially when exposed to extremes of weather.

Therefore, although such known filters can be used, another aspect of the present invention is the discovery that overexposed color negative film, developed by a standard process, is very suitable from the optical standpoint to act as an infrared filter, and also, the film contains the toughness and resistance to extremes of temperatures which are desirable in the present application. Accordingly, it has been discovered that it is possible to utilize ordinary color film, overexposed and developed, placing a section of such color film over the faces 156, 166 respectively of the output LED and the fiber optic light pipe 170 leading to the pin diode which receives the light signals.

The film is cut to size and mounted over the end of the light pipe with the emulsion side in, preferably in a conforming relation to the end faces of the key and receptacle, respectively.

Referring to another aspect of the physical construction of the preferred form of the invention, the key is preferably made as shown in FIG. 3, with the integrated circuit and other electronics being placed as shown and then encapsulated with an epoxy or like resinous compound which is chemically inert, and which not only acts as a bulk filler but also renders the case opaque so that coding similarities of the unit cannot be detected. Furthermore, the unit, when encapsulated, cannot be altered for improper purposes. Moreover, the encapsulation increases the reliability by holding the components in their intended orientation and providing protection of the mechanism against shocks from handling or the like.

Still further, the plastic material prevents liquids such as water or the like from affecting the circuit operation and this insures long life. An optional feature which can be provided is an end cap for the key which will protect the front or optical surface thereof from accidental abuse. Such a cap preferably contains a strip of ferrous material that acts as a magnetic keeper to shield the internal magnet from demagnetizing external forces, and thereby contributes further to the longevity of the apparatus.

The foregoing description has illustrated the use of a mechanical lock having certain of the usual features associated with known locks, and also additional novel features. However, it will be understood that the principles of the invention are also applicable to situations wherein access may be limited by means other than a lock per se.

For example, there are buildings wherein elevators may not be stopped at certain floors without insertion of a key, but where a lock in the usual sense is not involved. Likewise, codes of the kind dealt with in accordance with the invention can be used to perform other functions not directly connected with locks, such as energizing release mechanisms for payment of money at remote bank teller stations, for example, where security is controlled by an alarm rather than by a physical lock, by identification codes used for other purposes, etc. These conditions are sometimes collectively referred to as means having limited access or having coded access, or by words of like import.

It will thus be seen that the present invention provides a novel security system having a number of advantages and characteristics, including those pointed out above and others which are inherent in the invention. A preferred embodiment of the invention having been described by way of illustration, it is anticipated that changes and modifications of the described security system will occur to those skilled in the art and that such changes and modifications may be made without departing from the spirit of the invention or the scope of the appended claims.

What is claimed is:

1. An electronic security assembly comprising, in combination, a lock unit adapted to be mounted on a lockable element, said lock having a bolt unit movable between open and closed positions, said movement between open and closed positions being at least partially controlled by an electronic circuit comprising a key element for transmitting a train of a predetermined number of pulses and an unlocking element for receiving said train of pulses, said key element containing counter means able to be preset to a given number, an oscillator adapted, when energized, to emit a continuous stream of pulses at a predetermined frequency, means in said key for periodically interrupting said stream of pulses from the oscillator under the control of the counter, whereby said stream of output pulses is subdivided into a plurality of trains of pulses, each train comprising said given number of pulses, means for transmitting said trains of pulses from said key element to said unlocking element, said receiving element including a presettable counter for determining the number of pulses in each of said train of pulses, means for comparing the number of pulses actually in said train and said given number, and means for producing an unlocking signal permitting said bolt to move to said open position when said numbers coincide.

2. An electronic lock and key element as defined in claim 1 wherein each of said unlocking and key elements contains integrated circuits, said integrated circuits each containing one of said presettable counters and electrical circuitry adapted to act as said oscillator in said key and as a portion of said means for comparing said number of pulses in said train with said given number.

3. An electronic lock assembly as defined in claim 1 wherein said unlocking element includes a power supply, and a transformer primary winding, and switch means for energizing said supply and said primary winding, said key element including a transformer secondary winding adapted to be energized by said primary winding when said primary and secondary windings are in close physical proximity, said key element further including means for closing said switch when said key element and said unlocking element are in a physical position of registry, whereby moving said element into said position of registry energizes said primary winding so as to supply power to said key.

4. A lock and key assembly as defined in claim 1 wherein said means for comparing the number of pulses in said pulse trains comprises means associated with said counter for emitting a carry out pulse when said counter is full, a retriggerable oscillator adapted to move to a first logic state when not retriggered after a predetermined time period longer than the duration of one of said pulses in said pulse stream but shorter than the interval separating said trains of pulses, said oscillator being adapted to move to a second logic state in response to each pulse received, said comparing means including a logic circuit adapted to be enabled only when coincidentally receiving said carry out pulse and a signal from retriggerable oscillator indicative of said first logic state, said logic circuit thereby controlling said means for producing said unlocking signal.

5. An electronic lock and key assembly as defined in claim 1 wherein said means for transmitting said train of pulses from said key element to said unlocking element includes means in said key for transducing said pulses from electromagnetic pulses to infrared light pulses, means in said receiver for generating an electromagnetic signal in response to receipt of said infrared light pulses, and mutually cooperating light pipes in said key element and said unlocking element for respectively transmitting and receiving said infrared light pulses.

6. An electronic lock and key assembly as defined in claim 5 wherein said key element and said unlocking element include mutually cooperating surfaces for indexing said key element and said unlocking element into a position of registry so that said light pipes are axially aligned with each other.

7. A key for an electronic lock assembly, said key unit comprising an electrically energizable transmitter unit including a numerical pulse counter able to be preset to a given number less than its maximum capacity, said counter including means for generating a carry out pulse when said counter has reached its maximum capacity, said counter further including means enabling it to be reset to its original preset given number in response to a preset enabling signal, an oscillator adapted, when energized, to emit a continuous stream of clock pulses having a characteristic pulse duration, means for gating said stream of pulses to an output circuit, whereby said pulses are sent by said transmitter only if said gating means is enabled, a pulse generator adapted to control said gating means, said pulse generator being adapted to disable said gating means for an interval equal to a plurality of pulse durations, said pulse generator being energized by said carry out pulses, whereby, when said counter emits said carry out pulse, said pulse generator disables said gate means and causes said output of clock pulses to be interrupted, thereby subdividing said stream of clock pulses into individual pulse trains having a predetermined numerical count, and being separated by said plural pulse duration, said pulse generator also including means for presetting said counter after said carry out pulse has been generated, whereby said clock pulses will repeatedly be subdivided into pulse trains of said predetermined numerical count.

8. A key for an electronic lock assembly as defined in claim 7 which key further includes means for transducing said pulses into infrared light pulses, and means for directing said light pulses toward a receiver.

9. A key for an electronic lock assembly as defined in claim 7 which further includes a transformer secondary winding, a rectifying and filtering circuit, and an operative connection between said circuit and said counter, said oscillator and said pulse generator.

10. A receiver unit for an electronic security system comprised of a coded signal transmitter and a receiver, said receiver being adapted to receive at least one train of individual, identifiable pulses of a predetermined duration and separated from, preceding and following trains of pulses by a characteristic pulse-free interval greater than about one and one-half times said duration, said receiver being adapted to determine whether the number of pulses in said pulse train corresponds with a predetermined number in said receiver so as to operate as a decoder, said receiver including a counter adapted to count each of the pulses received by said receiver, and to emit a carry out pulse only when said counter is exactly full, a retriggerable oscillator having a characteristic time constant greater than said duration of one of said pulses, means for retriggering said oscillator in response to receipt of each of said pulses, said oscillator being adapted to emit a signal if not retriggered by a pulse within a time just greater than said predetermined duration, and means for comparing the time coincidence of said carry out pulse and said oscillator signal, said comparing means having means associated therewith for energizing an unlocking device only when said carry out pulse and said oscillator signal coincide.

11. An electronic lock and key assembly comprising, in combination, means for transmitting a numerically coded signal in the form of a series of pulses of predetermined duration, means for receiving said coded signal and means for comparing said transmittal signal with said received signal for determining the presence or absence of numerical coincidence between said signals, said transmitting means comprising a power receiving unit in the form of a transformer secondary winding, a rectifying and filtering circuit for producing relatively ripple-free direct current power from said secondary winding, an integrated circuit unit including an oscillator, and a pulse generator, said oscillator being adapted, when energized, to emit a continuous stream of electromagnetic pulses, said pulse generator, when energized, being adapted to interrupt transmission of said stream of pulses periodically into a pulse-free interval greater than the duration of said pulses, thereby creating a series of train individual pulses, each having the same number of pulses therein, and a presettable counter unit adapted to energize said pulse generator after counting a presettable number of pulses, said counter thereby controlling the number of pulses in each train, means for transducing said electromagnetic pulses to infrared light pulses, and means for directing said infrared light pulses to said means for receiving said coded signal, said receiving means including means for directing said infrared light pulses to a transducer for converting said pulses to electromagnetic pulses, means for amplifying said electromagnetic pulses and directing said amplified pulses to an integrated circuit, said integrated circuit including an amplifier, a retriggerable oscillator, a pulse generator and a counter unit, said counter unit including means for generating a carry out pulse when said counter reaches a predetermined number, said retriggerable oscillator being responsive to said interval between pulse trains to produce an output signal, means for determining coincidence of said carry out pulse and said output signal, and for causing said pulse generator to emit a signal only when said signals coincide, means for receiving and amplifying said pulse generator signal, means responsive to said amplified signal for unlocking a mechanical lock unit, a battery for supplying power to said receiver, said receiver unit further including a power oscillator powered by said battery and a transformer primary winding adapted to be energized by said power oscillator, said primary winding in said receiver being adapted to energize said transformer secondary in said transmitter when said windings are placed in physically adjacent relation, and switch means for energizing said power oscillator in said receiver when said transmitter is placed adjacent said receiver in a predetermined relation.

* * * * *

UNITED STATES PATENT AND TRADEMARK OFFICE
CERTIFICATE OF CORRECTION

PATENT NO. : 4,286,305
DATED : August 25, 1981
INVENTOR(S) : Eugene R. Pilat et al.

It is certified that error appears in the above—identified patent and that said Letters Patent is hereby corrected as shown below:

Column 13, line 25, after the wo rd "power", insert the word -- converter --;

13, line 34, delete the number "554", and in place thereof, insert the number -- 544 --;

14, line 32, delete the word "lins", and in place thereof, insert the word -- lines --;

15, line 14, delete the number "528", and in place thereof, insert the number -- 628 --;

15, line 55, delete the word "filer", and in place thereof, insert the word -- filter --;

16, line 53, delete the word "impresses", and in place thereof, insert the word -- impressed --;

UNITED STATES PATENT AND TRADEMARK OFFICE

CERTIFICATE OF CORRECTION

PATENT NO. : 4,286,305

DATED : August 25, 1981

INVENTOR(S) : Eugene R. Pilat et al.

It is certified that error appears in the above—identified patent and that said Letters Patent is hereby corrected as shown below:

Column 17, line 9, delete the word "in", and in place thereof insert the word -- as --;

19, line 1, delete the word "receive", and in place thereof, insert the word -- receiver --;

19, line 12, delete the word "Q1", and in place thereof, insert -- $Q_1$ --; and 19, line 54, delete the number "536-511", and in place thereof, insert -- 536, 511".

Signed and Sealed this

*Thirtieth* Day of *March 1982*

[SEAL]

*Attest:*

GERALD J. MOSSINGHOFF

*Attesting Officer* *Commissioner of Patents and Trademarks*